United States Patent [19]

Zimmerly

[11] Patent Number: 4,570,665
[45] Date of Patent: Feb. 18, 1986

[54] ASEPTIC VALVE WITH UNITARY VALVE SEAT AND LIP SEALS

[75] Inventor: Robert D. Zimmerly, Kenosha, Wis.

[73] Assignee: Ladish Co., Cudahy, Wis.

[21] Appl. No.: 680,094

[22] Filed: Dec. 10, 1984

[51] Int. Cl.[4] .......................... B08B 3/00; F16J 15/32
[52] U.S. Cl. .................................. 137/240; 137/241;
    251/324; 251/357; 277/206 A
[58] Field of Search .................. 137/238, 240, 241;
    251/62, 63, 63.5, 324, 357; 92/243, 245, 249;
    277/206 A

[56] References Cited

U.S. PATENT DOCUMENTS

| | | | |
|---|---|---|---|
| 2,011,547 | 8/1935 | Campbell | 251/357 |
| 2,047,120 | 7/1936 | Stout | 92/243 |
| 2,263,750 | 11/1941 | Willke | 251/357 |
| 2,876,982 | 3/1959 | Snider | 251/357 |
| 3,110,471 | 11/1963 | Kuhles | 251/62 |
| 3,176,595 | 4/1965 | Schwartz | 92/243 |
| 3,290,003 | 12/1966 | Kessler | 251/63.6 |
| 3,633,607 | 1/1972 | Werra | 137/241 |
| 4,183,500 | 1/1980 | Nightingale | 251/324 |

FOREIGN PATENT DOCUMENTS 509458  3/1952  Belgium ............................... 92/243

Primary Examiner—George L. Walton
Attorney, Agent, or Firm—Fuller, House & Hohenfeldt

[57] ABSTRACT

A valve stem is reciprocable in an axial bore of a valve body toward and away from the valve seat. The valve plug has integral lip seals for preventing leakage of product out the valve and preventing entry of foreign matter into the valve along the stem. The valve plug has integral seating surfaces having small and large diameters for seating on valve seats having small and larger diameters, respectively and hence the valve plug can be used for different size valves. Steam flows through the bore around the stem to serve as a barrier to entry of foreign matter and to sterilize the zone behind the valve plug and the rearward lip seal.

9 Claims, 4 Drawing Figures

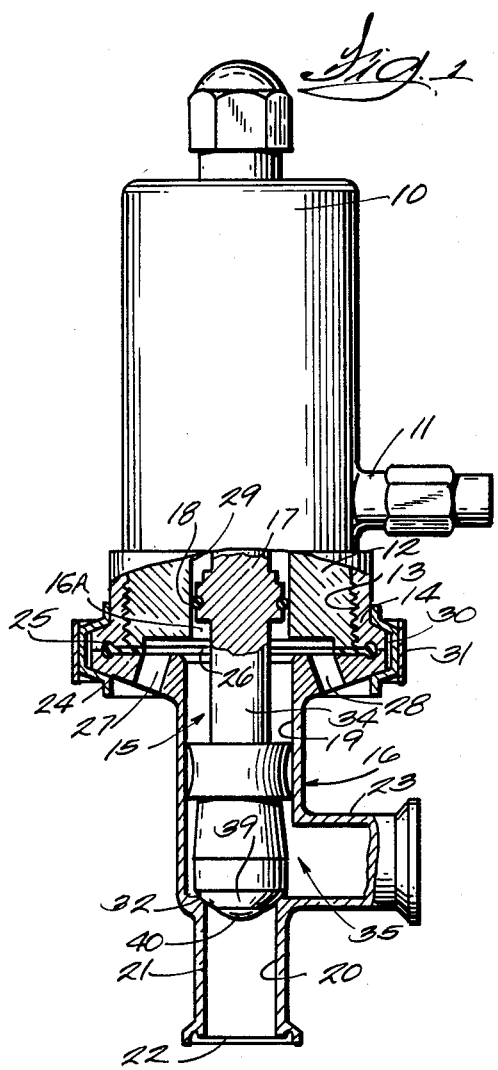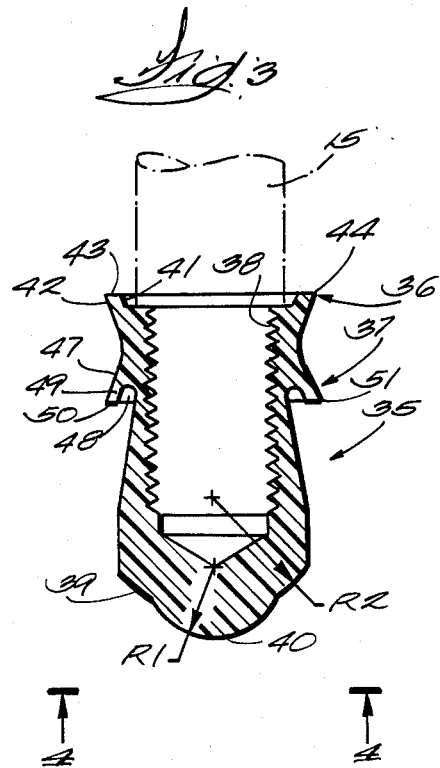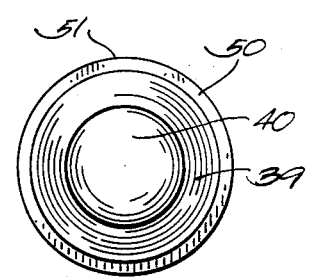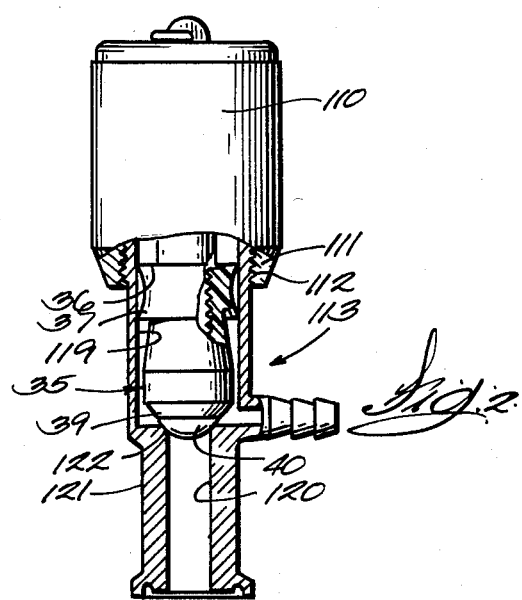

ASEPTIC VALVE WITH UNITARY VALVE SEAT AND LIP SEALS

BACKGROUND OF THE INVENTION

This invention pertains to valves and, particularly to valves used in processing systems which require the product to be kept in a sterile state.

Typical prior art aseptic valves comprise a body that supports a valve actuator. The actuator is adapted to reciprocate a stem to which a valve disk is attached that is movable toward and away from a seat to thereby alternately stop and permit flow of product through an opening surrounded by the seat. Generally, the valve stem is provided with one or more o-rings where it passes through the bonnet to prevent leakage of the pressurized product and prevent influx of contaminants from the environment to the body of the valve. The valve stem in aseptic valves customarily passes through a jacket on the bonnet through which steam at higher than atmospheric pressure flows to act as a positive barrier against migration of such contaminants as bacteria along the stem to its o-ring. The o-ring or rings on the stem are required to perform the dual functions of resisting steam pressure on one side and product pressure on the side, where the pressures are usually unbalanced, to thereby prevent leakage in either direction. O-rings, particularly after having aged, can lose their sealing capability. Thus, it is necessary to replace them occasionally, usually on a regular maintenance schedule. Moreover, as the o-ring size is increased to improve the seal, friction increases and more power or effort is required on the part of the actuator to reciprocate the valve stem.

Usually a spherical disk or plug is mounted to the stem for being engaged and disengaged with the valve seat so the plug makes circular line contact with the seat. Generally the diameter of the spherical plug is mated to the diameter of the seat surrounding the port which means that any given disk or plug design is dedicated to a particular valve seat size such that it is not feasible to use one plug in a valve of another size.

Prior art aseptic valves also required an aseptic joint which in effect was a pipe clamp for connecting the valve body and actuator bonnet together with a steam chamber around the clamp with inlet and outlet fittings to sterilize the joint. A prior art valve construction of this type is shown in U.S. Pat. No. 3,633,607. In addition in valves of this type a stem seal was required in the actuator bonnet of the valve rather than in the body and the stem seal moved during use into a zone in the bonnet that required sterilization.

SUMMARY OF THE INVENTION

The main objective of the present invention is to provide an aseptic valve which has improved sealing means for preventing entry of contaminants into the valve product zone and preventing exiting of product.

The valve is provided with lip seals on the valve plug in the valve bonnet with steam sterilization of the stem and proximal end of the valve plug. Hence the proximal lip seal always works in a sterile zone. Steam circulates through the bonnet-body joint to eliminate the need for a clamp with an integral steam chamber as employed in the prior art. The valve of the present invention provides improved product protection with reduced requirements for connection to sterilizing media.

A further objective is to provide a valve plug, that is configured in such manner that it can be used in valves of different sizes and having different seat diameters.

Another objective is to provide a valve plug body having individual oppositely acting lip seals which act independently to resist unbalanced steam and product pressures simultaneously, and further, to integrate on said body the surfaces that engage and disengage the valve seat.

How the foregoing and other more specific objects of the invention are achieved will become evident in the more detailed description of embodiments of the invention set forth in reference to the drawing.

DESCRIPTION OF THE DRAWINGS

FIG. 1 is an elevation view of an aseptic valve with parts in section to expose the new lip sealed multi-purpose valve plug;

FIG. 2 is an elevation view of a valve of a different size than that of the preceding figure, but using the same valve plug;

FIG. 3 is an isolated longitudinal sectional view of the new lip sealed multi-purpose valve plug; and FIG. 4 is a view of the plug looking in the direction of the arrows 4—4 in FIG. 3.

DESCRIPTION OF A PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

FIG. 1 shows an aseptic valve incorporating the invention. The valve is conventional in the respect that it comprises a housing 10 for containing a suitable actuator such as a pneumatic actuator, not visible. The compressed air line for the actuator is marked 11. The actuator is mounted on a cylindrical base 12 which has an external thread 13. A valve bonnet 14 has a corresponding internal thread so it can be screwed onto base 12 as shown. The actuator reciprocates a valve stem 15 axially to open and close the valve. Base 12 has a bore 16A to accommodate a diametrally enlarged portion 17 of stem 15. The enlarged portion has an annular groove which is occupied by an o-ring 18 that is in slidable and in sealing relationship with the smooth inside surface 29 of bore 16A. O-ring 18 guards against entry of contaminants into the valve from up above, that is, contaminants that might find their way from the environment through the valve actuator. The valve includes a body 16 that has a first bore 19. This bore is coaxial with and axially spaced from a second bore 20 which is in a tubular part 21 of the body. Tubular part 21 has an opening 22 for inlet of the product into the valve. The valve body is also provided with a tubular part 23 which is the product outlet in the illustrated design.

As shown in FIG. 1, the upper end of valve body 16 terminates in a radially extending flange-like portion 24. A gasket 25 is interposed between flange-like portion 24 and the co-planar bottom surfaces of bonnet 14 and actuator base 12. The bottom surface of base 12 and the top surface of flange-like portion 24 are suitably counterbored to provide an annular chamber 26 around stem 15 in the proximal zone 34 of the valve plug. A hole 27 is provided for connecting a pressurized steam line, not shown, to the valve body and another hole 28 is provided for a line, not shown, through which steam can exit from the body. Steam or other aseptic medium in liquid or gaseous form occupies and flows through chamber 26 at a positive pressure relative to the atmosphere to thereby serve as a medium for excluding solid contaminants such as bacteria as well as gaseous contaminants from the interior of the valve body and to also sterilize the parts. Steam can fill the space defined by bore 19 as well as chamber 26 and the pressurized steam is prohibited from escaping in one direction along stem 15 by o-ring 18.

The valve body 16 and bonnet 14 are clamped together by a conventional clamp having two elements 30 and 31. Element 30 is a ring that is split into two parts and has the cross-sectional shape somewhat like a truncated triangle so as to define axially diverging walls which are complementary in cross-sectional shape to the flange-like portions that extend from the valve bonnet and body. A uniform radially inward force on split ring 30 develops a wedging action on the valve bonnet and body which compresses the latter two elements toward each other to thereby compress the gasket 25. Split ring 30 is forced radially inward by clamping ring 31 which, in an actual embodiment, is similar to a hose clamp of the type comprising a metal band whose free ends are split and forced toward each other by tightening a screw, not shown.

In the FIG. 1 design the upper end of the valve inlet tubular portion 21 is provided with an axially tapered annular surface constituting a valve seat 32 that defines an opening disposed between the valve inlet and outlet. The new integrated lip seal and valve seating plug means is generally designated by the numeral 35 in FIG. 1. The plug means is alternately engaged with or retracted from contact with seat 32 for stopping or permitting, respectively, product flow between inlet 21 and outlet 23.

The new multi-purpose valve plug 35 having integral lip seals is shown in vertical section in FIG. 3. Plug 35 is a unitary body having axially spaced apart lip seals 36 and 37 near its proximal end at which it is attached to the valve acuating stem 15 that is shown in phantom lines in FIG. 3. Plug means 35 has an internal thread 38 which allows it to be screwed onto the lower end of correspondingly externally threaded valve stem 15. Thus, plug 35 can be reciprocated toward and away from valve seat 32 under the influence of stem 15 which is driven axially by any suitable actuator contained within housing 10. Preferably, plug 35 is composed of a material such as that know by the trademark Teflon, although other materials such as high molecular polyethylene a sanitary product could be used.

As can be seen in FIG. 3 taken in conjunction with FIG. 4, the lower or distal end of plug 35 is provided with annular valve seat closing surfaces 39 and 40 which are each segments of spheres having larger and smaller radiuses respectively. In the FIG. 1 embodiment, the larger radius annular sealing surface 39 has been driven into compressive contact with annular valve seat 32 to thereby stop product flow through the valve. The other sealing surface 40 is not operative in the FIG. 1 embodiment.

The lip seals 36 and 37 are adapted to engage in individual sliding sealing relationships with the bore 19 in the valve body for lip seal 37 to prevent leakage of product from the valve interior into bore 19 and lip seal 36 to prevent steam condensate and other contaminants from entering the valve interior which is occupied by product.

There is an annular groove in the upper end of the plug body which is bounded by the inside wall 41 of lip seal 36. The outside wall surface 42 is beveled upwardly and radially outwardly to thereby define an annular lip 43 which terminates in a sharp point or circular line 44. The diameter of this circular edge or line 44 is just slightly greater than the diameter of bore 19 in the valve body before the plug is installed in the valve. The annular lip 43 is thin enough for it to flex radially inwardly when it is pressed in a slightly undersized bore to thereby effect a sliding seal. Steam or condensate pressure acting on inside wall 41 of the lip tends to press the lip outwardly to enhance the sealing effect. It is important to obtain a good seal, however, that the outside surface 42 of the lip seal intersects with the top surface of the lip 43 at a sharp angle and without even a small axially extending cylindrical surface being formed prior to installation of the plug in bore 19.

The proximal end lip seal 36 may be otherwise characterized as a conical portion formed on the plug body whose radially outermost surface 42 diverges in a direction opposite from the distal end of the plug body. The base of the cone is provided with an annular groove or recess which is bounded by the radially inwardly presented wall surface 41. The material remaining between the conical outside of the cone and surface 41 constitutes the radially inwardly and outwardly yielding resilient slidable sealing lip. The base 43 of the cone lies in a plane to which the axis of the plug body is perpendicular. Thus, the base portion of the lip intersects the outer surface of the cone to provide a sharp edge 44. Fluid pressure in the groove inside the lip presses the lip radially outward to enhance contact pressure against the bore 19 surface when the plug is in use in the valve.

Lip 37 of the plug is an inverted form of lip 36 and serves to prevent product from leaking out of the valve body into bore 19. Lip 37 has an outer surface 47 that angulates downwardly and radially outwardly as shown and is undercut by an annular groove 48 which leaves the radially and downwardly extending lip 49 remaining. Here again, the radially extending surface 50 of lip seal 37 intersects the angularly extending lip outer surface 47 to create a sharp edge 51 whose properties and function are similar to sharp edge 44 on lip 36. In the case of lip seal 37, pressurized fluid in the valve body occupies the groove 48 and expands the lip 49 outwardly when the plug is installed in bore 19. Thus, the diameter of the circular outside edge 51 of the lip can, in fact, be on the order of a mil or two smaller than the diameter of bore 19 before the plug is inserted in the bore when it is mounted on the stem.

The lip seal 37 may be otherwise characterized as a conical portion formed on the plug body whose radially outermost surface 47 diverges toward the distal end of the plug body and terminates in a radially extending base which lies in a plane 50 to which the axis of the plug is perpendicular. The base intersects the diverging outermost surface to create a sharp edge 51 which wipes on the inside of bore 19 to effect a seal. The base has an annular groove 48 which results in a radially inwardly and outwardly yielding resilient sealing lip 49 being created.

FIG. 2 shows a valve that differs in size and style from the one shown in FIG. 1. The valve in FIG. 2 is provided with a housing 110 which contains a valve stem actuator, not visible. The housing base 111 is provided with an internal thread 112 that permits it to be screwed onto a mating external thread on the body 113 of the valve. The body has a bore 119 that is coaxial with a bore 120 which serves as the product inlet to the valve. The bore 120 in the cylindrical body 121 of the valve terminates in an annular beveled valve seat 122. The annular valve seat 122 in the FIG. 2 valve has a smaller diameter than valve seat 32 in the FIG. 1 valve but, the same plug 35 can be used in both valves despite the difference in size between the valves. In the FIG. 2 example, the smaller radius (R1) spherical segment 40 of the plug cooperates with the smaller diameter valve seat 122. The larger radius (R2) spherical segment is now doing nothing. The lip seals 36 and 37 on the plug 35 in FIG. 2, of course, have the same outside diameters as the lip seals on plug 35 in FIG. 1. Bores 19 and 119 have the same diameters.

Various types of valve actuators can be employed to operate the valve.

The valve of the present invention reduces the sterilization requirements of the prior art valves by employing a stem seal on the valve plug and the organization of parts to position the stem seal in a completely sterilized zone adjacent the valve plug.

I claim as my invention:

1. A valve comprising a body having wall means defining an inlet and an outlet and a circular seat defining an opening interposed between said inlet and outlet, said body having a first bore arranged coaxially with said opening and having an end surface, an actuator bonnet having an end surface and means for coupling said bonnet to said body with said end surfaces in abutting and sealing relationship and said bonnet having a second bore coaxial with the first bore, a stem coaxial with and axially reciprocable in said bores, said stem being slidably sealable within said second bore, and valve plug means attached to said stem said valve plug means including unitary sealing means at the distal end for reciprocating into and out of engagement with said seat and for controlling product flow between said inlet and outlet and further including upper and lower lip seals for sealing said first bore and steam passage means for conducting steam into and out of said first and second bores between said plug means and bonnet for pressurizing said first and second bores and said upper sealing lip against said first bore and said product flow pressurizing said lower sealing lip against first bore when said plug means is in an open position to prevent any of the product flow from migrating beyond said sealing lips and into said first and second bores.

2. A valve in accordance with claim 1 wherein said end surface include walls forming a steam chamber between said bonnet and said body and said steam passage means including wall means defining a steam inlet and steam outlet communicating with said chamber to afford sterilization of the proximal zone in which said valve plug moves during use.

3. A valve in accordance with claim 1 including a stem seal on said stem to confine said steam to said steam chamber.

4. A valve in accordance with claim 2 including gasket means between said end surfaces to confine said steam to said steam chamber to sterilize the joint between said body and said bonnet.

5. A valve comprising a body having an inlet and an outlet and a circular seat defining an opening interposed between said inlet and outlet, said body having a first bore arranged coaxially with said opening, bonnet means compelled to said body and having a second bore coaxial with the first bore, a stem coaxial with and axially reciprocable in said bores, said stem being slidably sealable within said second bore, and plug means including unitary seating means attached to said stem for reciprocating into and out of engagement with said seat for controlling product flow between said inlet and outlet and further including upper and lower lip seal means for sealing said first bore, and means for conducting steam into and out of said first bore for pressurizing said first and second bores and said upper sealing lip means against said first bore and said product flow pressurizing said lower sealing lip means against said first bore when said plug means is in an open position to prevent any of the product flow from migrating beyond said upper and lower sealing lip means and into said first and second bores, said plug means comprising:

a generally cylindrical axially extending body having a distal end having said means for seating on said seat to close said valve opening and having a proximal end at which it attaches to said stem, a first portion of said body comprising a cone having its radially outermost surface diverging toward said distal end and terminating in a circular base projecting radially outwardly from said body and intersecting said outermost surface to form a sharp circular edge around the cone having a diameter substantially equal to that of the first bore said base having an annular groove concentric to the plug axis and opening toward said distal end and the radially outermost diameter of said groove being slightly less than the outside diameter of said base to thereby define said lower means which includes a radially inwardly and outwardly yieldable lip seal having said sharp edge, a second portion of said body more remote from said distal end than the first portion comprising a cone having its radially outermost surface diverging axially away from said distal end and terminating in a circular base projecting radially outwardly from said body and intersecting said outermost surface to form a sharp circular edge around the cone, said base having an annular groove concentric to the plug axis and opening toward said proximal end and the radially outermost diameter of said groove being slightly less than the outside diameter of said base to thereby define said upper lip means which includes a radially inwardly and outwardly yieldable lip seal having said sharp edge.

6. The plug means according to claim 5 wherein bases of said cone portions on said lips lie in planes, respectively, to which the axis of said plug means is perpendicular.

7. The plug means according to claim 5 where said means for seating on said seat comprises first and second spherical segments formed on said body, the first segment being at said distal end and having one diameter and there second segment having a larger diameter than the first segment and being axially adjacent said first segment such that the first segment can cooperate with a valve seat whose opening has one diameter and said first segment can extend through another valve seat having an opening diameter larger than said one diameter so said second spherical surface can cooperate with said other valve seat having the larger diameter opening.

8. A valve according to any one of claim 1, 2, or 5 wherein said plug means is composed of Teflon.

9. A valve according to any one of claims 1, 2, or 5 wherein said plug means is composed of polyethylene.

* * * * *